United States Patent [19]

Jensen et al.

[11] Patent Number: 5,320,311
[45] Date of Patent: Jun. 14, 1994

[54] BRACKET MOUNTING ASSEMBLY

[75] Inventors: Tyler D. Jensen, Sunrise; William H. Robertson, Jr., Plantation; Michael H. Bartlett, Coral Springs, all of Fla.

[73] Assignee: Motorola, Inc., Schaumburg, Ill.

[21] Appl. No.: 983,346

[22] Filed: Nov. 30, 1992

[51] Int. Cl.⁵ .............................................. F16M 13/00
[52] U.S. Cl. ..................................... 248/27.1; 248/291
[58] Field of Search ............... 248/27.1, 27.3, 316.8, 248/291, 185, 300, 904, 187, 683, 664, 923, 920; 181/198; 381/188

[56] References Cited

U.S. PATENT DOCUMENTS

| | | | |
|---|---|---|---|
| 1,990,491 | 2/1935 | Johnston | 248/185 X |
| 2,660,368 | 11/1953 | Schmidt et al. | 248/185 |
| 4,071,217 | 1/1978 | Kongelka | 248/459 X |
| 4,196,821 | 4/1980 | Teti, Jr. et al. | 248/291 X |
| 4,480,809 | 11/1984 | Healey | 248/291 X |
| 4,494,830 | 1/1985 | Grainge et al. | 359/876 X |
| 4,832,299 | 5/1989 | Gorton et al. | 248/122 X |
| 4,964,606 | 10/1990 | Beam et al. | 248/923 X |

FOREIGN PATENT DOCUMENTS 3406582  8/1985  Fed. Rep. of Germany ...... 248/664

Primary Examiner—Karen J. Chotkowski
Attorney, Agent, or Firm—Leslie A. Rhyne

[57] ABSTRACT

A mounting assembly for attachment to a housing comprising a bracket (10) having two side supports (14) separated by a horizontal bottom support (11) and at least one set of spacers (16, 18) having self-retaining means for connecting the spacers to one of the side supports (14) of the bracket (10). A ribbed extension (44) is disposed on an outside of one of the spacers (18) for slideably attaching to the housing (10). The spacers (16, 18) include means for incrementally rotating one of the spacers (18) with respect to the bracket (10) thus incrementally rotating the housing (10) when the housing (10) is attached to the spacers (16, 18).

10 Claims, 2 Drawing Sheets

BRACKET MOUNTING ASSEMBLY

TECHNICAL FIELD

This invention relates generally to bracket mounting assemblies and, more particularly, to vehicle bracket mounting assemblies for radios.

BACKGROUND

With an increase in the number of devices that are being removably mounted in vehicles, there is an increase in the demand for simple, yet sturdy, bracket assemblies for mounting such devices. Such devices include radios, CD players, speakers, or any other devices that are desired to be removably mounted in a bracket assembly. Such bracket assemblies need not to be limited to use in a vehicle.

Conventional bracket assemblies include U-shaped brackets with two side supports having apertures for receiving screws. Screws are manually screwed through the side supports into the sides of the device housing. Two hands are needed to attach such devices to the bracket assembly. One hand to hold the device in place in the mounting assembly and another to tighten the screws.

The screws do not reliably hold the device in a desired position in the bracket assembly. If the bracket assembly is used in a vehicle and the vehicle encounters rough driving conditions the desired position of the device is often lost. The screws do not have enough surface area contact nor do the screws provide enough tension with the device to reliably hold the device in the bracket assembly. The screws also tend to scratch and wear the housing of the device so that over time the attachment of the device in the bracket assembly is minimal at best resulting in a malfunctioning bracket assembly. Furthermore, the screws must be constantly manipulated in order to change the orientation of the housing device.

The housing of such a device may include gear teeth for mating with gear teeth on the bracket assembly but a screw is still required for attaching the housing to the bracket assembly. Furthermore, with a separate mating part on the housing device there is the problem that over time the contact is dulled and the teeth wear and there is no longer a sturdy and reliable hold on the housing device. Such gear teeth are often stripped resulting in a housing that drops vertically in a position so that the display is unreadable and the controls are not reachable. This becomes a real problem if the housing device is for a police radio involved in a high speed chase.

The conventional bracket mounting assemblies require screws or other devices to maintain the housing position. The conventional bracket mounting assemblies do not provide both the mechanisms for slideably attaching a housing device to the bracket and for incrementally rotating the housing device on the bracket assembly.

SUMMARY OF THE INVENTION

Briefly, according to the invention, a mounting assembly for attachment to a housing includes a bracket having two side supports separated by a horizontal bottom support and at least one set of spacers having self-retaining means for connecting to one of the side supports. In one aspect of the invention, a ribbed extension is disposed on an outside of one of the spacers for slideably attaching to the housing. In another aspect of the invention, gear teeth are used for incrementally rotating one of the spacers with respect to the bracket thus incrementally rotating the housing when attached to the spacers.

DETAILED DESCRIPTION OF THE PREFERRED EMBODIMENT

Figure 1:
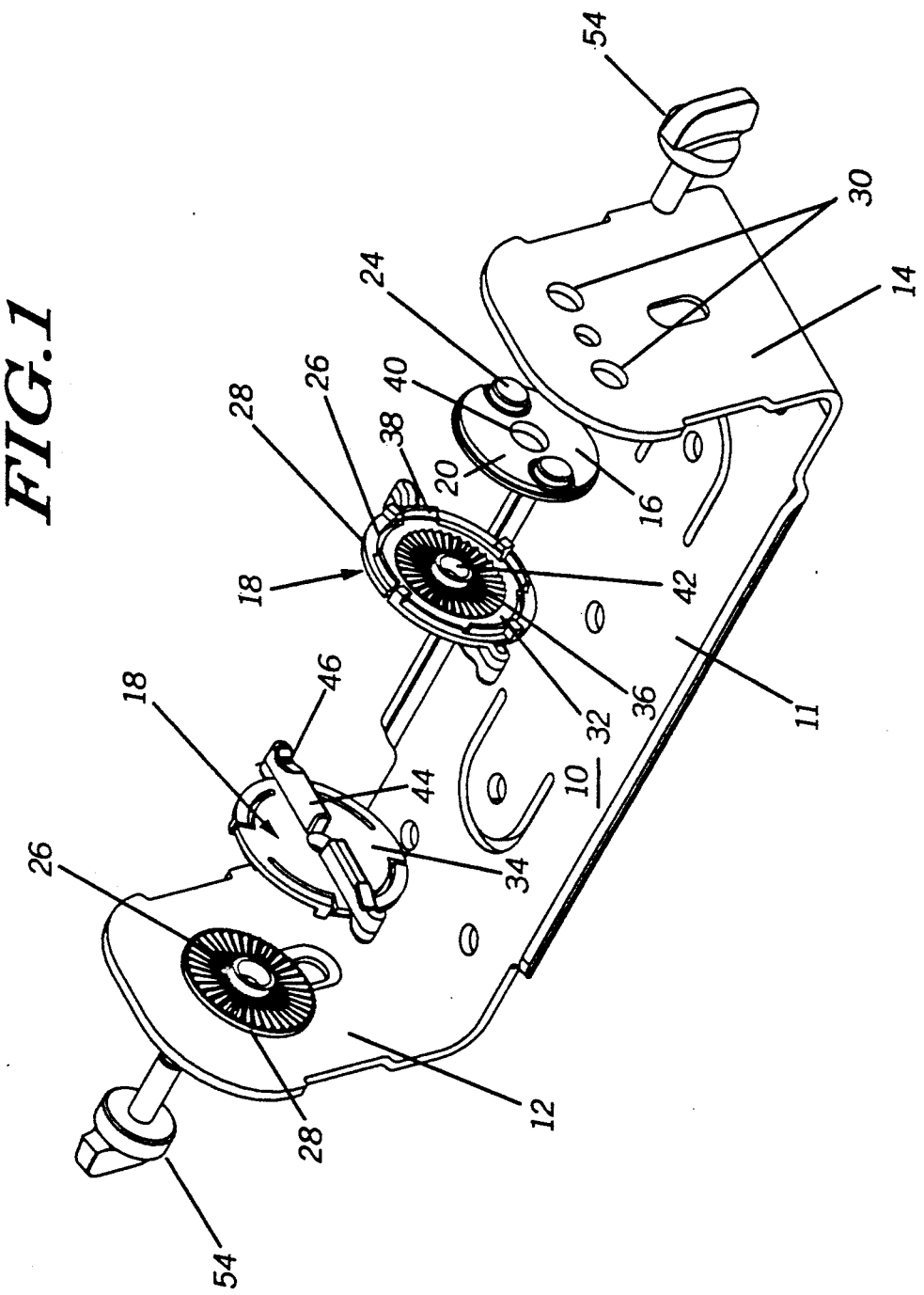
FIG. 1 is an exploded perspective view of a mounting assembly according to the present invention.

Referring to FIG. 1, a mounting assembly bracket 10 is shown having two side supports 12 separated by a horizontal bottom support 11. Two sets of spacers, each set including an inner spacer 16 and an outer spacer 18 are shown. Each set of spacers is attached to one side support 12 of the bracket assembly 10. The spacers may be made from a polycarbonate material or any other suitable material. Both inner spacer 16 and outer spacer 18 have a first side 20, 32 and a second side 22, 34, respectively. The first side 20 of the inner spacer 16 has two protrusions or bosses 24 for press fitting into apertures 30 in the side supports 12 of the bracket 10. Thus, the inner spacer 16 is self-retained on the bracket 10. There is no need for any additional screws or bolts for attaching the spacers 16, 18 to the bracket 10. The inner spacer 16 is self-retained to the side support 12 by simply pressing the bosses 24 into the apertures 30 of the side support 12 as shown in FIG. 1. The second side 22 of inner spacer 16 includes gear teeth 26 and a rim 28 extending along a periphery of the gear teeth 26.

The first side 32 of the outer spacer 18 is shown to have four cantilevered snaps 38 for snapping onto the rim 28 of the inner spacer 16. The snaps 38 are connected to the rim 28 so that the outer spacer 18 is rotationally coupled to the inner spacer 16. Again no additional bolts or screws are needed to attach the spacers 16, 18 together. A bearing surface 42 is centrally disposed on an axis of the outer spacer 18 for mating with an aperture 40 centrally disposed on the inner spacer 16. The bearing surface 42 and aperture 40 insure that the inner spacer 16 and outer spacer 18 are constantly symmetrically aligned. The first side 32 of the outer spacer 18 also includes gear teeth 36 for mating with the gear teeth 26 of the inner spacer 16. The gear teeth allow incrementally rotating the outer spacer 18 with respect to the inner spacer 16 and bracket 10. The gear teeth 26, 36 are designed so that rotating the gear teeth one increment equates to approximately 10 degrees shift in orientation of an attached housing device. The second side 34 of outer spacer 18 includes a ribbed extension 44 for sliding into a trough 52 located on a radio housing 50 as shown in FIG. 2.

Figure 2:
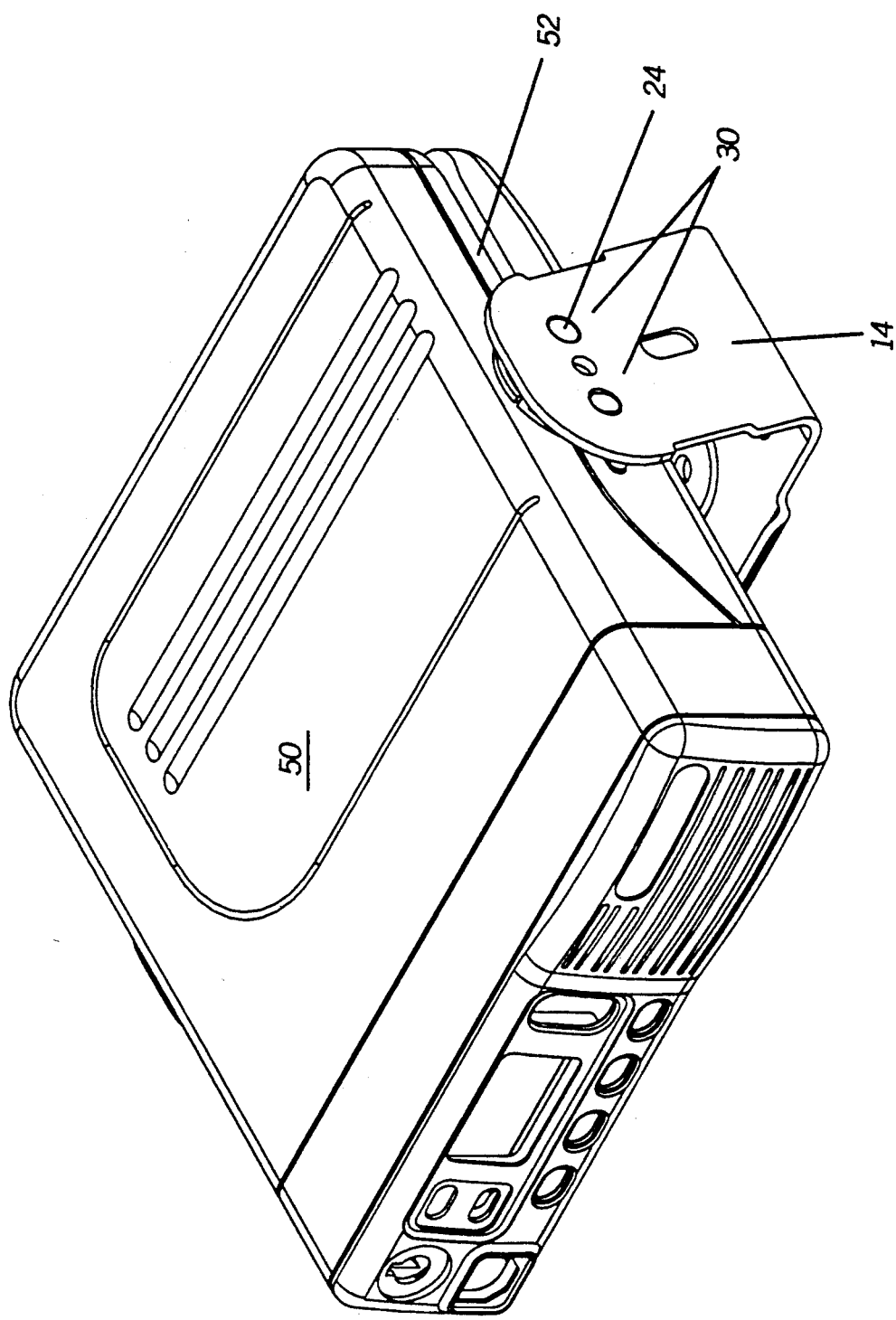
FIG. 2 is a perspective view of a radio attached into the mounting assembly of the present invention.

FIG. 2 shows a radio 50 mounted onto the bracket assembly 10. The radio includes a trough 52 on each side of the radio housing 50 for slideably receiving the ribbed extension 44 of the outer spacer 18. The ends 46 of the ribbed extension 44 may be notched for locking into an end (not shown) of the trough 52 of the radio housing. The spacers 16, 18 allow for the radio 50 to be slideably attached and locked onto the bracket assembly 10 with one simple motion. Only one hand is required. Thus, when the radio 50 is attached to the bracket assembly 10 it may be incrementally adjusted by simply rotating the radio 50 to any desired orientation. The spacers 16, 18 are designed to hold the radio 50 sturdy in any desired orientation. If additional sturdiness is required or if a user wishes to lock the radio 50 in a particular orientation, a wing screw 54 may be screwed into apertures in the bracket assembly 10 through the side supports 14 and spacers 16, 18 as shown in FIG. 1.

What is claimed is:

1. A mounting assembly for supporting a radio comprising:
   a bracket having a first side support and a second side support separated by a horizontal bottom support,
   at least one inner spacer having a first side and a second side,
   a) said first side of said inner spacer having self-retaining means for attaching to one of said side supports of said bracket,
   b) said second side of said inner spacer having gear teeth and a rim extending along a periphery of said gear teeth; and
   at least one outer spacer having a first side and a second side,
   a) said first side of said outer spacer having gear teeth for mating with said gear teeth of said inner spacer and incrementally rotating said outer spacer with respect to said inner spacer and at least two cantilevered snaps for attaching to said rim of said inner spacer so that said outer spacer is rotationally coupled with respect to said inner spacer,
   b) said second side of said outer spacer having a ribbed extension for being slideably attached to said radio.

2. The mounting assembly of claim 1 further comprising a bearing surface centrally disposed on said first side of said outer spacer and an aperture centrally disposed through said inner spacer for receiving said bearing surface and symmetrically aligning said spacers.

3. The mounting assembly of claim 1 wherein the number of cantilevered snaps is four.

4. The mounting assembly of claim 1 wherein said bracket comprises a pair of said spacers.

5. The mounting assembly of claim 1 further comprising a wing screw extending through an axis of the inner spacer and outer spacer and through an aperture in one of said side supports of said bracket for securely tightening said radio to said bracket.

6. A radio and bracket assembly comprising:
   a radio,
   a U-shaped bracket having two side supports separated by a horizontal bottom support,
   1) at least one inner spacer having a first side and a second side,
      a) said first side of said inner spacer having self-retaining means for attaching to one of said side supports of said bracket,
      b) said second side of said inner spacer having gear teeth and a rim extending along a periphery of said gear teeth; and
   2) at least one outer spacer having a first side and a second side,
      a) said first side of said outer spacer having gear teeth for mating with said gear teeth of said inner spacer and for incrementally rotating said outer spacer with respect to said inner spacer and at least two cantilevered snaps for attaching to said rim of said inner spacer so that said outer spacer is rotationally coupled with respect to said inner spacer, and
      b) said second side of said outer spacer having a ribbed extension for being slideably attached to said radio.

7. The assembly of claim 6 further comprising a bearing surface centrally disposed on said first side of said outer spacer and an aperture centrally disposed through said inner spacer for receiving said bearing surface and symmetrically aligning said spacers.

8. The assembly of claim 6 wherein the number of cantilevered snaps is four.

9. The assembly of claim 6 wherein said bracket comprises a pair of said spacers.

10. The assembly of claim 6 further comprising a wing screw extending through an axis of the inner spacer and outer spacer and through an aperture in one of said side supports of said bracket for securely tightening said radio to said bracket.

* * * * *